(12) United States Patent
Brinker et al.

(10) Patent No.: US 7,711,668 B2
(45) Date of Patent: May 4, 2010

(54) ONLINE DOCUMENT CLUSTERING USING TFIDF AND PREDEFINED TIME WINDOWS

(75) Inventors: Klaus Brinker, Princeton, NJ (US);
Fabian Moerchen, Princeton, NJ (US);
Bernhard Glomann, Bayonne, NJ (US);
Claus Neubauer, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 317 days.

(21) Appl. No.: 12/072,254

(22) Filed: Feb. 25, 2008

(65) Prior Publication Data

US 2008/0205775 A1 Aug. 28, 2008

Related U.S. Application Data

(60) Provisional application No. 60/891,599, filed on Feb. 26, 2007.

(51) Int. Cl.
*G06N 5/00* (2006.01)
(52) U.S. Cl. .......................................... 706/45; 706/20
(58) Field of Classification Search .................. 706/20, 706/45; 707/5; 382/225
See application file for complete search history.

(56) References Cited

U.S. PATENT DOCUMENTS

| | | | |
|---|---|---|---|
| 7,251,637 B1* | 7/2007 | Caid et al. ..................... 706/15 |
| 2004/0117736 A1* | 6/2004 | Newman ..................... 715/523 |
| 2007/0162241 A1* | 7/2007 | Yuan et al. ..................... 702/81 |
| 2008/0183665 A1* | 7/2008 | Brinker et al. ................. 707/2 |
| 2008/0205774 A1* | 8/2008 | Brinker et al. ............. 382/225 |
| 2008/0294651 A1* | 11/2008 | Masuyama et al. .......... 707/100 |
| 2009/0037440 A1* | 2/2009 | Will et al. ................... 707/100 |

OTHER PUBLICATIONS

Radev et al., Centroid-based summarization of multiple documents, 2003, Elsevier Ltd, pp. 919-938.*

Y. Yang, et al., "A Study on Retrospective and On-Line Event Detection", Proc. Int'l ACM Conf. on Research and Development in Information Retrieval (SIGIR), pp. 28-36, 1998.

J. Allan, et al., "On-Line New Event Detection and Tracking", Proc. Int'l ACM Conference on Research and Development in Information Retrieval (SIGIR), pp. 37-45, 1998.

P. Indyk, et al., "Locality-Preserving Hashing in Multidimensional Spaces", Proc. of the ICM Symposium on Theory of Computing, pp. 618-625, 1997.

(Continued)

*Primary Examiner*—David R Vincent

(57) ABSTRACT

Documents from a data stream are clustered by first generating a feature vector for each document. A set of cluster centroids (e.g., feature vectors of their corresponding clusters) are retrieved from a memory based on the feature vector of the document and a relative age of each of the cluster centroids. The centroids may be retrieved by retrieving a set of cluster identifiers from a cluster table, the cluster identifiers each indicative of a respective cluster centroid, and retrieving the cluster centroids corresponding to the retrieved cluster identifiers from a memory. A list of cluster identifiers in the cluster table may be maintained based on the relative age of cluster centroids corresponding to the cluster identifiers. Cluster identifiers that correspond to cluster centroids with a relative age exceeding a predetermined threshold are periodically removed from the list of cluster identifiers.

30 Claims, 4 Drawing Sheets

OTHER PUBLICATIONS

P. Indyk, et al., "Approximate Nearest Neighbor: Towards Removing the Curse of Dimensionality", Proc. of the ACM Symposium on Theory Computing, 1998.

A. Gionis, et al., "Similarity Search in High Dimensions Via Hashing", Proc. of the Int'l Conference on Very Large Databases (VLDB), 1999.

J. Callan, "Document Filtering with Inference Networks", Proc. Int'l ACM Conf. On Research & Development on Information Retrieval (SIGIR), pp. 262-269, ACM Press, 1996.

J. Banerjee, et al., "Competitive Learning Mechanisms for Scalable, Incremental and Balanced Clustering of Streaming Texts", Proc. of IJCNN, vol. 4, pp. 2697-2702, 2003.

M. Franz, et al., "Unsupervised and Supervised Clustering for Topic Tracking", Proc. Int'l ACM Conf. on Research and Development in Information Retrieval, pp. 310-317, 2001.

T. Brants, et al., "A System for New Event Detection", Proc. Int'l ACM Conference on Research and Development in Information Retrieval, pp. 330-337, ACM Press, 2003.

Y. Zhao, et al., "Hierarchical Clustering Algorithms for Document Datasets", Data Mining and Knowledge Discovery, 10(2) pp. 141-168, 2005.

D. Cutting, et al., "A Cluster-Based Approach to Browsing Large Document Collections", Proc. Int'l ACM Conf. on Research & Develop. in Inform. Retrieval, pp. 318-329, 1993.

B. Larsen, et al., "Fast and Effective Text Mining Using Linear-Time Document Clustering", Int'l ACm Conf. on Knowledge Discovery and Data Mining (KDD) pp. 16-22, 1999.

H. Schuetze, et al., "Projections for Efficient Document Clustering", Proc. Int'l ACM Conf. on Research & Develop. in Information Retrieval, pp. 74-81, ACM Press, 1997.

\* cited by examiner

ONLINE DOCUMENT CLUSTERING USING TFIDF AND PREDEFINED TIME WINDOWS

CROSS REFERENCE TO RELATED APPLICATIONS

This application claims the benefit of U.S. Provisional Application No. 60/891,599 filed Feb. 26, 2007, which is incorporated herein by reference. This application is related to co-pending U.S. patent application Ser. No. 12/008,886, filed Jan. 15, 2008, co-pending and concurrently filed U.S. patent application Ser. No. 12/072,179, entitled "Document Clustering Using A Locality Sensitive Hashing Function", filed Feb. 25, 2008, and co-pending and concurrently filed U.S. patent application Ser. No. 12/072,222, entitled "Relevance Ranking for Document Retrieval", filed Feb. 25, 2008, each of which is incorporated herein by reference.

BACKGROUND OF THE INVENTION

The present invention relates generally to data clustering, and more particularly to clustering data according to the relative age of data clusters. Clustering is the classification of objects (e.g., data, documents, articles, etc.) into different groups (e.g., partitioning of a data set into subsets (e.g., clusters)) so the objects in each cluster share some common trait. The common trait may be a defined measurement attribute (e.g., a feature vector) such that the feature vector is within a predetermined proximity (e.g., mathematical "distance") to a feature vector of the cluster in which the object may be grouped. Data clustering is used in news article feeds, machine learning, data mining, pattern recognition, image analysis, and bioinformatics, among other areas.

Conventional data clustering can be hierarchical or partitional. Hierarchical data clustering finds successive clusters using previously established clusters, whereas partitional data clustering determines all clusters at once.

Hierarchical algorithms can be agglomerative or divisive. Agglomerative algorithms begin with each object as a separate object or, in some cases, separate clusters, and merge them into successively larger clusters. Divisive algorithms begin with the whole set and divide it into successively smaller clusters. These algorithms are often iterative. That is, each object and/or each cluster is continually reevaluated to determine if the current cluster for a particular object is the best cluster for that object (e.g., the cluster with the feature vector nearest the feature vector of the object). As new objects enter the clustering system and/or as objects are clustered into new clusters, the feature vectors of the clusters will change, constantly requiring evaluation and/or updating of each object in each cluster.

Partitional algorithms, such as k-means and bisecting k-means algorithms are also conventionally used in clustering. However, such algorithms suffer similar deficiencies as hierarchical algorithms in that they are computationally intense and require multiple iterations. This requires more memory and slows the clustering rate of the system.

The growth of the Internet has allowed rapid dissemination of news articles. News articles produced at a seemingly continuous rate are transmitted from news article producers (e.g., newspapers, wire services, etc.) to news aggregators, such as Google News, Yahoo! News, etc. The news aggregators use combinations of software and human interaction to sort news articles into clusters for display. These clustering methods result in delays in serving articles to users and inaccurate clustering.

Increased access to numerous databases and rapid delivery of large quantities of information (e.g., high density data streams over the Internet) has overwhelmed such conventional methods of data clustering. Further, end users desire increasingly sophisticated, accurate, and rapidly delivered data clusters. For example, multiple news providers as well as other content providers such as weblog (e.g., blog) servers, etc. deliver tens of thousands to hundreds of thousands of news articles each day. Each article is evaluated and assigned a measurement attribute, such as one or more feature vectors based on words in the news article. The news articles are streamed to clustering services at such a high rate and volume that multiple iterations, as used in conventional methods, of clustering would significantly slow down clustering systems.

As clustering progresses, increasingly large numbers of documents are contributed to the system and increasingly large numbers of clusters are created and modified. As the number of clusters grows, clustering delays occur since each incoming article must be compared to each cluster to determine the most appropriate cluster for each article. The increasingly large numbers of comparisons slow the system and delay availability of clustered articles to users.

Therefore, alternative methods and apparatus are required to efficiently, accurately, and relevantly cluster objects from continuous high density data streams.

BRIEF SUMMARY OF THE INVENTION

The present invention provides a method of clustering a plurality of documents from a data stream. First, a feature vector is generated for each document. A set of cluster centroids are retrieved from a memory based on the feature vector of the document and a relative age of each of the cluster centroids. The centroids may be retrieved by retrieving a set of cluster identifiers from a cluster table, the cluster identifiers each indicative of a respective cluster centroid, and retrieving the cluster centroids corresponding to the retrieved cluster identifiers from a memory.

In one embodiment, a list of cluster identifiers in the cluster table may be maintained based on the relative age of cluster centroids corresponding to the cluster identifiers. In at least one embodiment, cluster identifiers that correspond to cluster centroids with a relative age exceeding a predetermined threshold are periodically removed from the list of cluster identifiers.

Documents are clustered by determining a distance between the feature vector of the document and each of the cluster centroids and assigning the document to a cluster based on the determined distances. If the determined distances between the feature vector of the document and a plurality of cluster centroids are below a predetermined threshold, the document is assigned to clusters corresponding to that plurality of cluster centroids. If the determined distance between the feature vector of the document and a cluster centroid is below a predetermined threshold and below the determined distances between the feature vector of the document and the other centroids the document is assigned to only that cluster. If none of the determined distances between the feature vector of the document and the cluster centroids are below a predetermined threshold the document is assigned to a new cluster.

These and other advantages of the invention will be apparent to those of ordinary skill in the art by reference to the following detailed description and the accompanying drawings.

DETAILED DESCRIPTION

The present invention generally provides methods and apparatus for online document clustering. Specifically, the present invention provides methods and apparatus for efficient, accurate clustering of documents from continuous high density data streams. For simplicity of presentation, the present invention will be described in terms of a news clustering system and method, though one of skill in the art would recognize how to use the invention described herein in clustering of any type of information, such as in machine learning, data mining, pattern recognition, image analysis, bioinformatics, etc.

Accordingly, the term "document" as used herein may be interpreted as any object, file, document, article, sequence, data segment, etc. Documents, in the news article clustering embodiment described below, may be represented by document information such as their respective textual context (e.g., title, abstract, body, text, etc.) and/or associated biographical information (e.g., publication date, authorship date, source, author, news provider, etc.). That is, in the following description, "documents" refers also to corresponding document information indicative of the document. One of skill in the art would recognize appropriate manners of utilizing such document information in lieu of corresponding documents.

As used herein, "words" refers equally to complete words as they appear in a document and word stems as is known unless specifically stated otherwise. Similarly, "words" also refers to sequences, symbols, etc. in other forms of documents.

Figure 1:
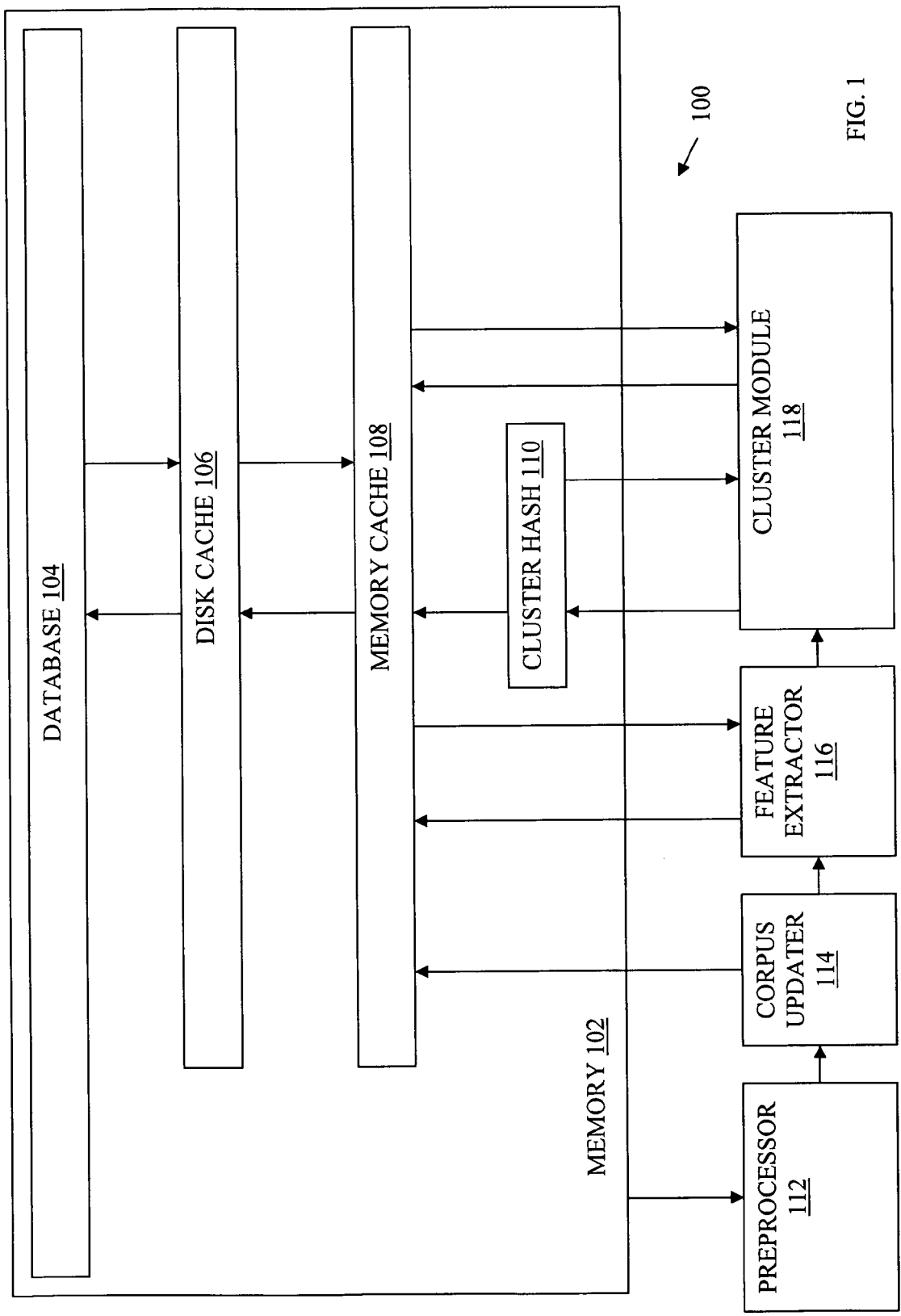
FIG. 1 depicts a document clustering system according to an embodiment of the present invention.

FIG. 1 depicts an exemplary document clustering system 100 according to an embodiment of the present invention. Document clustering system 100 as depicted in FIG. 1 includes data structures and logical constructs in a database system, such as a relational database system. Accordingly, though described herein as individual interconnected (e.g., logically, electrically, etc.) components of document clustering system 100, the various components of document clustering system may be implemented in any appropriate manner, such as a database management system implemented using any appropriate combination of software and/or hardware. Document clustering system 100 includes a memory 102 that may include a database 104, a disk cache 106, a memory cache 108, and a cluster hash 110, all for storing documents and/or information about documents (e.g., features, feature vectors, word statistics, document information, keys, indexes, key-value pairs, etc.) and clusters and/or information about clusters (e.g., cluster identification information, cluster objects, cluster centroids, etc.). Document clustering system 100 further includes a preprocessor 112 that may receive document information from memory 102 (e.g., from database 104, disk cache 106, memory cache 108 and/or cluster hash 110) and pass along document information to, in turn, a corpus updater 114, a feature extractor 116, and a cluster module 118. Each of corpus updater 114, feature extractor 116, and cluster module 118 may be in communication with and able to receive information from and pass information to one or more components of memory 102.

Hardware and software implementations of the basic functions of memory 102, database 104, disk cache 106, and memory cache 108 are well known in the art and are accordingly not discussed in detail herein except as they pertain to the present invention. Though described herein as a memory 102 comprising database and cache components, one of skill in the art would recognize other components and methods for implementing the functions of the present invention. For simplicity of presentation, an embodiment of the invention is discussed further as using database 104, disk cache 106, and memory cache 108 in a particular fashion. However, other implementations may be used, including omitting disk cache 106 and/or memory cache 108 by storing information in database 104, disk cache 106 and/or memory cache 108, etc. Similarly, cluster hash 110 may be a data structure, cluster table, or hash table as is generally known. Accordingly, cluster hash 110 may associate key information with cluster identification information stored in memory 102 and may be stored generally in memory 102 or specifically in database 104, disk cache 106, memory cache 108, and/or another location.

In a similar fashion, corpus updater 114, feature extractor 116, and cluster module 118 may be implemented on any appropriate combination of software and/or hardware. Their respective functions are described in detail below with respect to the method steps of method 200 of FIG. 2.

Though described as a document clustering system 100, it should be recognized that the functions of the document clustering system 100 as a whole and/or its constituent parts may be implemented on and/or in conjunction with one or more computer systems and/or controllers (e.g., controller 400 of FIG. 4 discussed below). For example, the method steps of methods 200 and 300 described below and/or the functions of preprocessor 112, corpus updater 114, feature extractor 116, and clustering module 118 may be performed by controller 400 of FIG. 4 and the resultant clusters, clustered documents, and/or related information may be stored in one or more internal and/or components of memory 102. In an alternative embodiment, one or more controllers (e.g., similar to controller 400) may perform conventional preprocessing of preprocessor 112, corpus updating of corpus updater 114, and/or feature extraction of feature extractor 116 and a separate one or more controllers (e.g., similar to controller 400) may perform the inventive clustering of cluster module 118. The resultant clusters, clustered documents, and/or related information may then be stored in one or more internal and/or external databases (e.g., similar to database 104).

Figure 2:
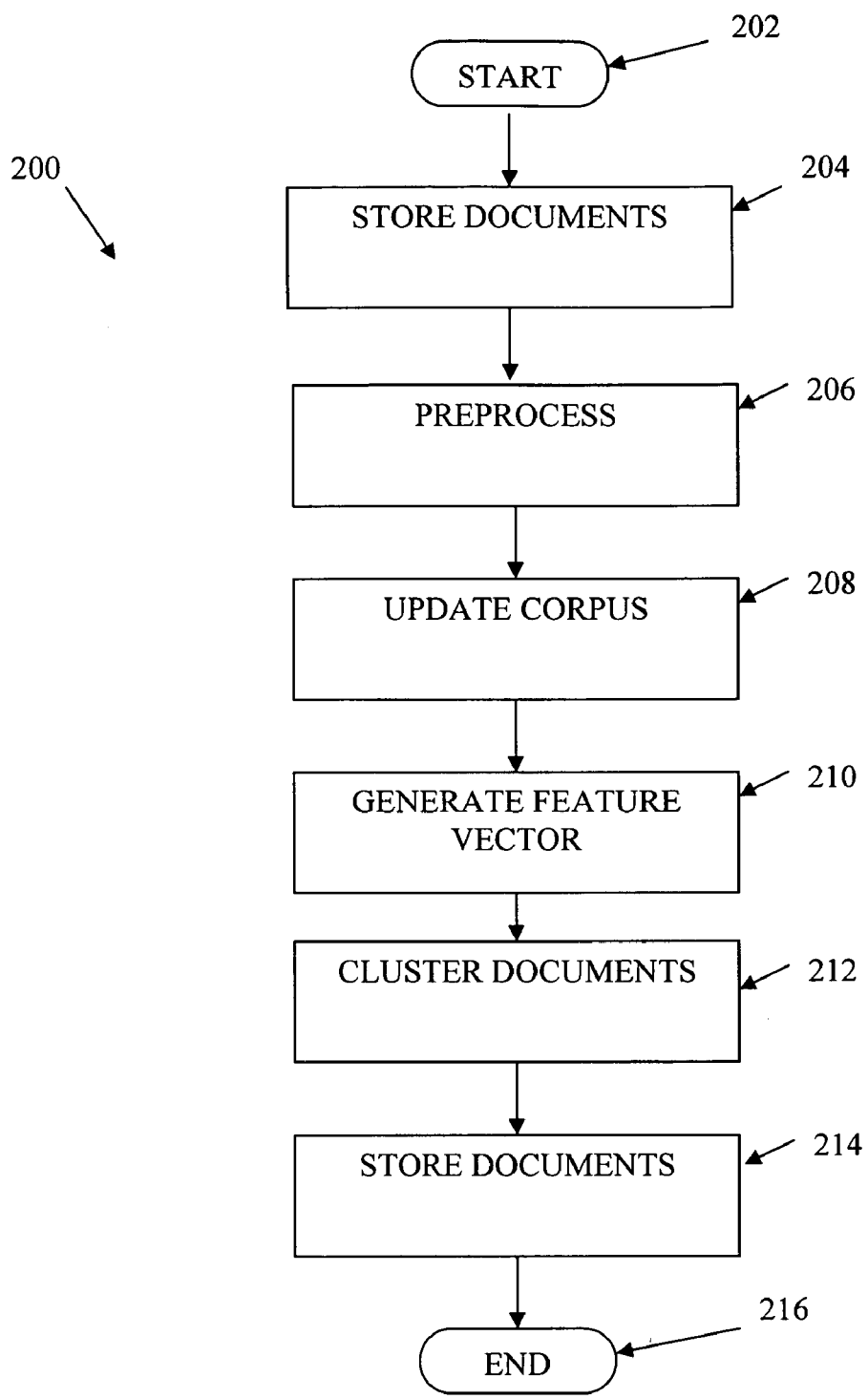
FIG. 2 depicts a flowchart of a method of document clustering.

FIG. 2 depicts a flowchart of a method 200 of document clustering according to an embodiment of the present invention. The document clustering method 200 may be performed by one or more components of document clustering system 100. The method begins at step 202.

In step 204, documents are stored. Documents may be news articles in a data stream from one or more online news services, article servers, or other document databases and/or servers. In at least one embodiment, documents may be received over an internal and/or external network, the Internet, or the like. Documents are stored in memory 102. In at least one embodiment, documents and/or textual representations of documents (e.g., files indicative of the words of an article) may be stored in database 104.

After storage of one or more documents, the documents are preprocessed in step 206 at preprocessor 112. Preprocessing of documents may occur individually and/or in batches retrieved from database 104. Preprocessing may include text mining and/or data mining as is known. In some embodiments, stop words (e.g., common words) may be removed (e.g., filtered) from consideration. Such stop words may include parts of speech such as articles, copulas, prepositions, etc., and/or other common terms such as corporate designations (e.g., Inc., Corp., SA, etc.), names of authors, news servers or sources (e.g., AP, NY Times, etc.).

In the same or alternative embodiments, preprocessing may include word stemming. That is, words may be reduced to their respective roots (e.g., parts of words common to all variants of that word). In this way, words with the same root are grouped as the same word stem. In some embodiments, certain words may include entries for both whole words and word stems to accentuate the importance of certain variants of words. Preprocessing may further include determining the frequencies of words and/or word stems. Preprocessing and/or further processing of documents such as metadata emphasis, keyword emphasis, etc. used in some embodiments of the present invention is further described in U.S. patent application Ser. No. 12/008,886, filed Jan. 15, 2008 and incorporated herein by reference.

In step 208, a text corpus is updated. The text corpus is a data storage area of memory 102. The corpus may be stored in memory 102, such as in memory cache 108, and may be updated by corpus updater 114. The corpus in memory cache 108 stores the frequencies of currently relevant words in document clustering system 100. Document word frequencies (e.g., the number of times each word stem appeared in a document) determined during preprocessing in step 206 may be sent to memory cache 108 and the word frequencies stored in the corpus may be updated. That is, entries for each word may be updated with the addition of new instances of words in newly preprocessed documents. Word stems not already stored in the corpus may be added as appropriate. To ensure bounded processing time and memory consumption, the total number of words stored in memory cache 108 may be restricted. If a maximum memory (e.g., a predetermined and/or adjustable limit of the number of words in the corpus) is exceeded, one or more words may be expunged from the corpus. In at least one embodiment, words that have not occurred in a preprocessed document for the longest period of time are removed from the corpus. That is, the words that have had their frequencies updated least recently may be removed. Thus, the corpus is adaptive to changing topics in the data stream.

In step 210, a feature vector is generated. The feature vector is a numerical representation of an object. In the context of step 210, the feature vector is a numerical representation of a document. For example, a feature vector may be an n-dimensional vector of numerical features representing a document where n is the number of words in the document and the numerical features are a determined numerical value describing each word. The feature vector for each document may be generated by the feature extractor 116. In at least one embodiment, a single feature vector for each document is generated. In at least one embodiment, the numerical value (e.g., feature of each word) is a Term Frequency Inverse Document Frequency (TFIDF) determined as described below.

After a large number of documents have been preprocessed in step 206 and their corresponding word stems have been used to update the corpus in step 208, the most frequent words in the corpus will correspond to very common terms, (e.g., 'year', 'Monday', 'January', 'state', 'nation', 'program', etc.) that are not sufficiently general to be used as stop words as described above. During feature generation in step 210, such common words will be assigned a low weight in the feature vector. Words with lower frequencies are, generally, more useful to distinguish between different topics and are weighted accordingly. The least frequently found words generally correspond to misspellings, rare terms, and other aberrations. Accordingly, these words are assigned low weights as well.

Term Frequency (TF) is the number of times a word appears in a document. In at least one embodiment, this information may be determined during preprocessing in step 206 and/or during corpus updating in step 208 and the resultant term frequencies may be retrieved from memory cache 108 by feature extractor 116 for feature generation. In calculation of TFIDF, N is the number of documents processed, Document Length ($DL_k$) is the length of the $k^{th}$ document in words, and Document Frequency (DF) is the number of documents having each word.

$$TF' \text{ may then be } \left( \frac{TF}{TF + 0.5 + \frac{1.5 \cdot DL_N}{\frac{1}{N} \cdot \sum_{i=1}^{N} DL_i}} \right).$$

Inverse Document Frequency $$(IDF) \text{ is } \left( \frac{\log\left(\frac{N + 0.5}{DF}\right)}{\log(N + 1)} \right).$$

TFIDF may then be determined as TF'·IDF or $$TFIDF = \left( \frac{TF}{TF + 0.5 + \frac{1.5 \cdot DL_N}{\frac{1}{N} \cdot \sum_{i=1}^{N} DL_i}} \right) \cdot \left( \frac{\log\left(\frac{N + 0.5}{DF}\right)}{\log(N + 1)} \right).$$

In this way, a feature for each word in a document may be determined. These features may then be used to generate a feature vector for the document. That is, a mathematical representation (e.g., a feature vector) based on information about the words in the document may be generated for the document by feature extractor 116.

In step 212, documents are clustered. In at least one embodiment, documents are clustered by cluster module 118. As discussed above, high density data streams favor single-pass clustering for timely, efficient clustering. Further details of document clustering as in step 212 are discussed below with respect to method 300 of FIG. 3.

Any appropriate method of clustering may be used. In some embodiments, an indexing structure for efficient retrieval of the nearest neighbor may be used in clustering as described in detail in co-pending U.S. patent application Ser. No. 12/072,179, entitled "Document Clustering Using A Locality Sensitive Hashing Function", filed Feb. 25, 2008 and incorporated herein by reference. Using the single feature vector for each document generated in step 210, a single index can be used to determine the closest cluster among the set of candidate clusters without performing an exhaustive search, improving the clustering speed over methods multiple feature vectors. In prior methods using multiple feature vectors to represent each document and each cluster, several index structures would need to be maintained and queried. This would require more computations and memory than the inventive method described in U.S. patent application Ser. No. 12/072,179, entitled "Document Clustering Using A Locality Sensitive Hashing Function", filed Feb. 25, 2008. Furthermore, in prior methods the nearest neighbors reported by each index could be different, thus requiring additional strategies to determine the nearest cluster with respect to all feature vectors.

After clustering, the documents, clusters, and/or information about the documents and/or clusters are stored in one or more databases 104 in step 214. The method ends at step 216.

Figure 3:
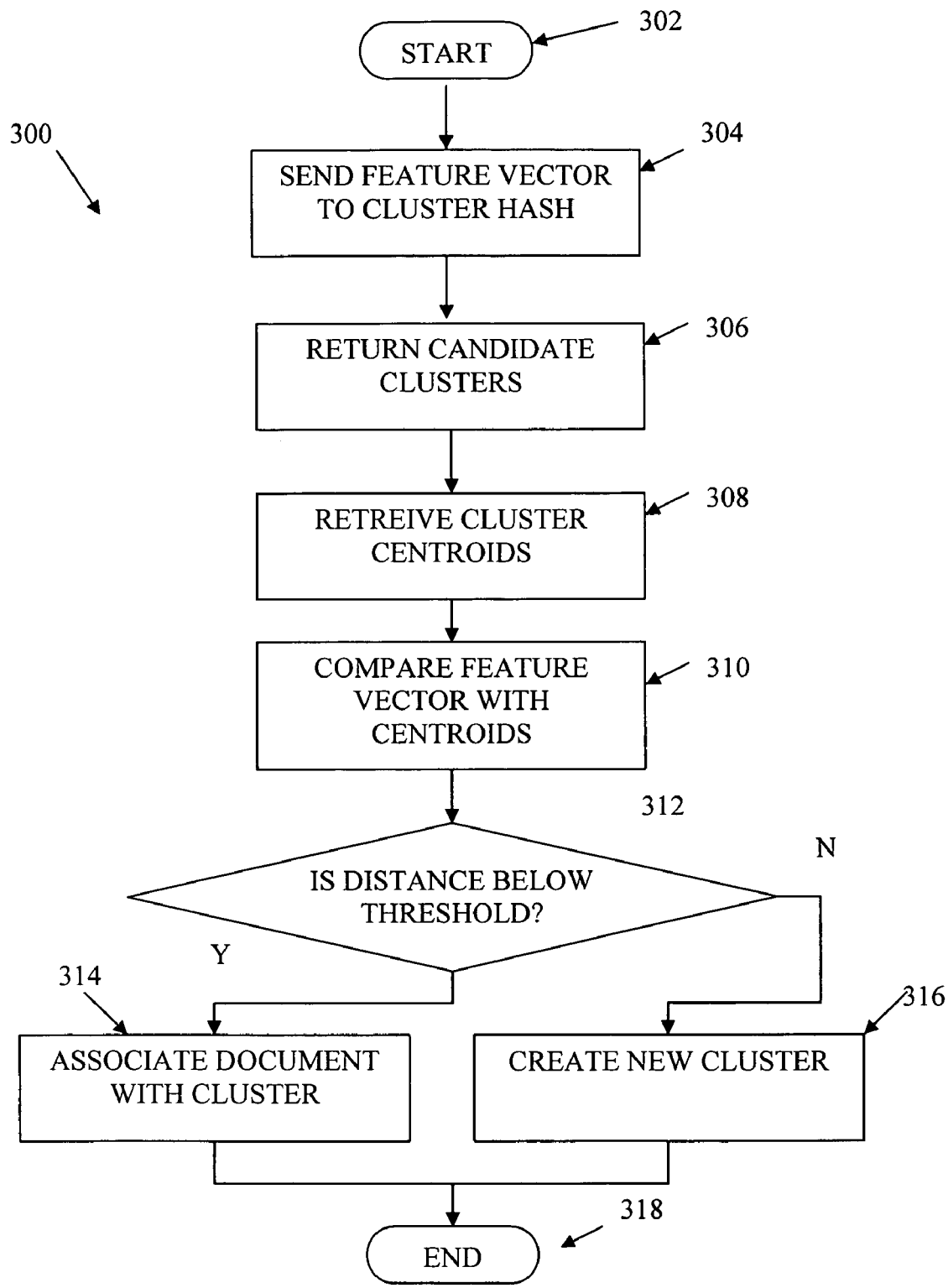
FIG. 3 depicts a flowchart of a method of clustering a document according to an embodiment of the present invention.

FIG. 3 depicts a flowchart of a method 300 of clustering a document according to an embodiment of the present invention. Document clustering method 300 may be performed by document clustering system 100 and may be the document clustering step 212 of method 200 described above. The method begins at step 302.

Clusters may each have associated statistics (e.g., biographical information). In at least one embodiment, such information may be stored in an associated cluster object. The cluster object may comprise statistics about the cluster and the documents in the cluster. Such statistics may include size of the cluster, number of documents in the cluster, number of sources referenced by documents in the cluster, date of authorship of documents in the cluster, date information about when each document was added to the cluster, etc. Accordingly, each cluster may have an associated relative age stored with the cluster object.

Herein, the "age" of a document, object, cluster, etc. is an adjustable designation of a period of time associated with the document, object, cluster, etc. in relation to a reference point. Accordingly, the age may be a designation such as a local or global date or time, may be a designation of a period of time in relation to a synchronizing device (e.g., a clock, pulse, etc.), may be a relative position to a reference point and/or to another document, object, cluster, etc. (e.g., first, second, third, etc.), or may be any other means of designating a time period from one event (e.g., a document entering the system, a clustering, a batching, etc.) until another event. Similarly, the age may be fine or loose. That is, the age may be a specific date, time, and/or position, or may be a relative grouping or batching (e.g., all documents arriving within on calendar day are the same "age", etc.).

The cluster age may be an average age of the documents in the cluster, a timestamp of the most recently added document, a date and/or time of the most recently added document, or any other appropriate measure of the relative age of the information in the cluster. A cluster having had a document recently associated with it (e.g., added to it) may be considered to be a relatively new cluster and/or have a young relative age. As will be discussed below, using the age of a document and/or a cluster may enable more efficient clustering by encouraging use of and updating recent clusters based on relative age.

Clusters may also each have a centroid—a feature vector indicative of the documents in that cluster. That is, a feature vector describing and/or generally representative of all the documents in each cluster may be generated and/or used as a cluster centroid. In some embodiments, the centroid may be a mathematical approximation or calculation of the feature vector of the cluster. For example, the centroid may be an average of all the vectors of all the documents associated with that cluster. In alternative embodiments, the feature vector of one document may be selected as the centroid of the cluster. The selected feature vector may be a feature vector most representative of the documents in the cluster. The cluster centroid may be associated with the cluster, the cluster identification information, and/or the cluster object as is described herein.

In step 304, a feature vector of a document (received from feature extractor 116 or memory 102) or information indicative of the feature vector is sent to cluster hash 110 from cluster module 118. Cluster hash 110, which contains information (e.g., cluster identification information) for clusters stored in database 104, returns a set of candidate clusters to the cluster module 118 in step 306. That is, based on the feature vector of the document a hash value is calculated. The hash value is used to identify a set of cluster identifiers stored in the cluster hash 110. The feature vectors (e.g., centroids) of the candidate clusters are selected to be similar to the feature vector of the document with high probability. For example, a locality sensitive hashing function may be employed as described in U.S. patent application Ser. No. 12/072,179, entitled "Document Clustering Using A Locality Sensitive Hashing Function", filed Feb. 25, 2008. Of course, other appropriate hashing methods may be employed.

In some embodiments, to process documents more quickly, an incoming document is only compared to clusters that have been updated within a predetermined period of time. That is, the feature vector of a document may only be compared to cluster centroids representative of clusters that have had another document added to them within a predetermined time window. In this way, out of date stories and/or clusters are not considered and processing time may be reduced. In some embodiments, cluster identification information may only be maintained (e.g., stored, listed, etc.) by cluster hash 110 for a certain predetermined number of clusters. That is, a limited number of entries may be stored in cluster hash 110, each entry being representative of cluster identification information for one cluster. In the same or alternative embodiments, the cluster hash 110 may maintain a list of cluster identification information indicative of clusters with a relative age below a predetermined threshold. In some embodiments, the predetermined threshold may be adjustable based at least in part on the available storage space in memory 102. That is, cluster hash 110 may maintain a list of cluster identification information for only a certain total volume of clusters and the clusters selected to be maintained on the list may be the "newest" clusters (e.g., the clusters with the lowest relative age).

In step 308, the cluster module 118 retrieves cluster centroids and/or cluster objects for the set of candidate clusters returned in step 306. To facilitate efficient use of the resources of memory 102, cluster centroids and/or cluster objects may be cascaded in memory 102 such that cluster module 118 may request a cluster centroid and/or a cluster object for a particular document cluster from memory cache 108. If that particular cluster has been recently updated and/or accessed, it may be available (e.g., stored temporarily) in memory cache 108 and may be retrieved by cluster module 118. If that cluster has been accessed and/or updated less recently, memory cache 108 may not have a stored version of the cluster centroid and/or cluster object and may request such information from the disk cache 106. Similarly, if that particular cluster has been recently updated and/or accessed, it may be available (e.g., stored temporarily) in disk cache 106 and may be retrieved by memory cache 108 and passed to cluster module 118. If that cluster has been accessed and/or updated less recently, disk cache 106 may not have a stored version of the cluster centroid and/or cluster object and may request such information from the database 104. Database 104 may then return the information to disk cache 106, memory cache 108, and/or cluster module 118.

In step 310, the feature vector of the document is compared to the retrieved cluster centroid(s). In one embodiment, a document's feature vector is compared to all known clusters (e.g., clusters stored in memory 102). That is, the mathematical distance in a feature space between the feature vector of the document and the centroid (e.g., feature vector) of each cluster is determined. The distance may be a cosine distance $$D_c(\vec{d}_i, \vec{d}_j) = 1 - \frac{\sum_{k=1}^{T} d_{ik} d_{jk}}{\sqrt{\sum_{k=1}^{T} d_{ik}^2 \cdot \sum_{k=1}^{T} d_{jk}^2}}$$

where $\vec{d} = [d_1, \ldots, d_T]$ is the feature vector generated in step 210 of method 200. Thus, $D_c(\vec{d}_i, \vec{d}_j)$ is a distance measure between the feature vector of the document and the feature vector of the cluster. In some embodiments, each feature vector is normalized to a unit length, eliminating the renormalization otherwise necessary for every distance computation.

In step 312, a determination is made as to whether the distance between the feature vector of the document and the centroid of the cluster is less than a threshold. If the distance measure between the document's feature vector and any cluster centroid is below a predetermined threshold, the document is associated with a cluster in step 314. In some embodiments, the document is associated with all clusters corresponding to those cluster centroids. In at least one embodiment, the predetermined threshold is approximately 0.75. Of course, other thresholds may be used as appropriate. In an alternative embodiment, if the distance measure between the feature vector and any cluster centroid is below the predetermined threshold, the document is associated with the closest cluster centroid (and thus the cluster).

If no cluster is found where the distance measure is below the threshold, the document forms a new cluster in step 316. Of course, other distance measures may be used. In some embodiments similarity measures may be used. The similarity measure may then be compared to a predetermined threshold and, if the similarity measure exceeds the predetermined threshold, the document is added to the cluster.

The method ends at step 318.

Figure 4:
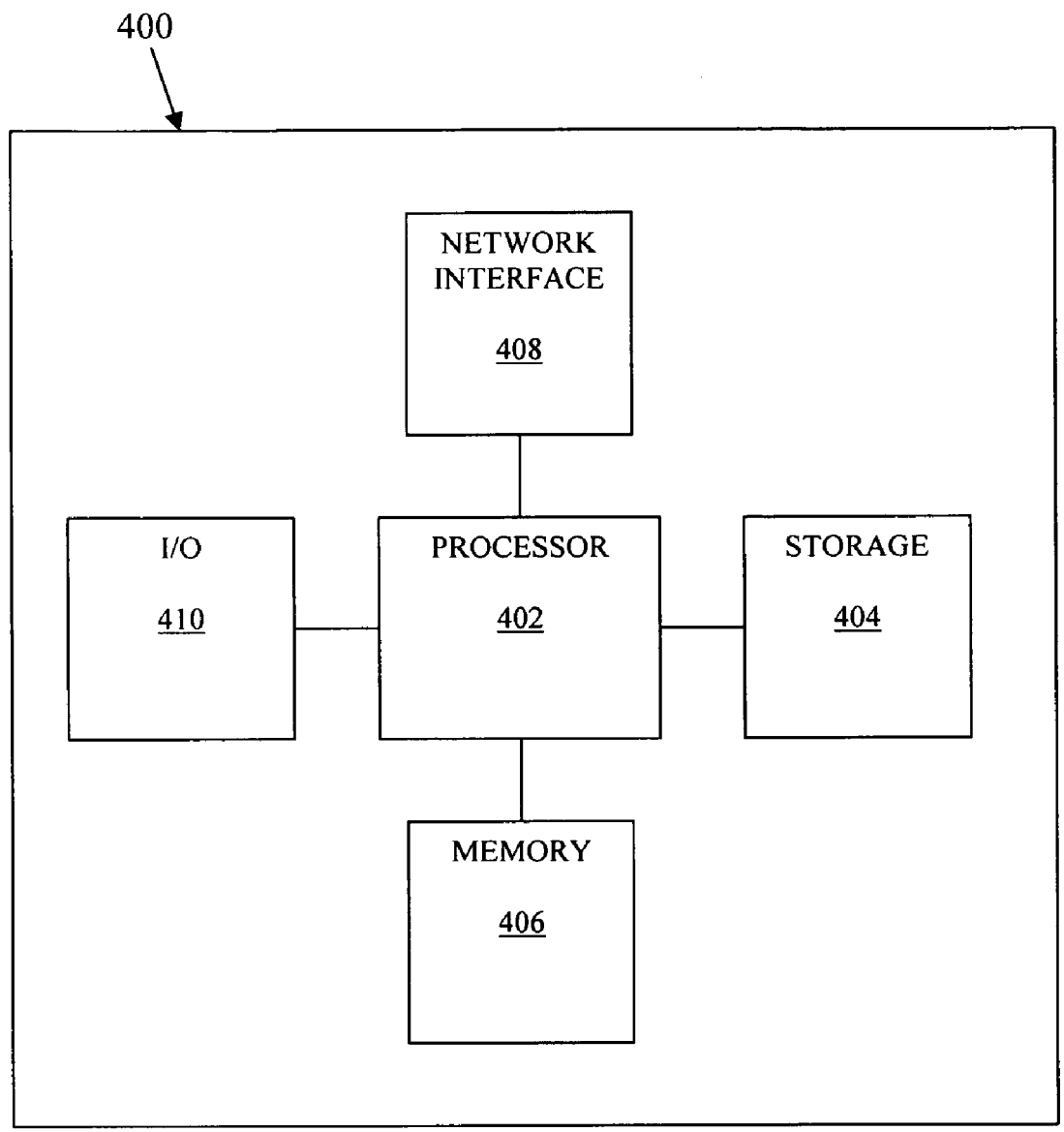
FIG. 4 is a schematic drawing of a controller.

FIG. 4 is a schematic drawing of a controller 400 according to an embodiment of the invention. Controller 400 may be used in conjunction with and/or may perform the functions of document clustering system 100 and/or the method steps of methods 200 and 300.

Controller 400 contains a processor 402 that controls the overall operation of the controller 400 by executing computer program instructions, which define such operation. The computer program instructions may be stored in a storage device 404 (e.g., magnetic disk, database, etc.) and loaded into memory 406 when execution of the computer program instructions is desired. Thus, applications for performing the herein-described method steps, such as preprocessing, metadata extraction, feature extraction, and clustering, in methods 200 and 300 are defined by the computer program instructions stored in the memory 406 and/or storage 404 and controlled by the processor 402 executing the computer program instructions. The controller 400 may also include one or more network interfaces 408 for communicating with other devices via a network. The controller 400 also includes input/output devices 410 (e.g., display, keyboard, mouse, speakers, buttons, etc.) that enable user interaction with the controller 400. Controller 400 and/or processor 402 may include one or more central processing units, read only memory (ROM) devices and/or random access memory (RAM) devices. One skilled in the art will recognize that an implementation of an actual controller could contain other components as well, and that the controller of FIG. 4 is a high level representation of some of the components of such a controller for illustrative purposes.

According to some embodiments of the present invention, instructions of a program (e.g., controller software) may be read into memory 406, such as from a ROM device to a RAM device or from a LAN adapter to a RAM device. Execution of sequences of the instructions in the program may cause the controller 400 to perform one or more of the method steps described herein, such as those described above with respect to methods 200 and 300. In alternative embodiments, hardwired circuitry or integrated circuits may be used in place of, or in combination with, software instructions for implementation of the processes of the present invention. Thus, embodiments of the present invention are not limited to any specific combination of hardware, firmware, and/or software. The memory 406 may store the software for the controller 400, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

It is noted that for simplicity of description, the term "cluster" is used herein generally to globally describe the documents that form a cluster, a cluster object, a cluster centroid, cluster identification information, and/or any other information related to the cluster. For example, when referred to as retrieving or returning a candidate cluster, the actual documents that form the cluster are not returned, but a representation of the cluster (e.g., the cluster centroid) is returned or retrieved instead. Similarly, "hash" is used generally to describe the known concepts of hashing, hash tables, etc. Accordingly, the description of the present invention should be understood as illustrative of clustering using a locality sensitive hashing function.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is;

1. A computer implemented method of clustering a plurality of documents from a data stream comprising:
    updating a text corpus by removing one or more words that have occurred least frequently in a preprocessed document,
    generating a Term Frequency Inverse Document Frequency (TFIDF) to be used as a feature vector for a document in the plurality of documents;
    retrieving a set of cluster centroids based on the feature vector of the document and a relative age of each of the cluster centroids;
    determining a distance between the feature vector of the document and each of the cluster centroids representative of clusters that have had another document added to them within a predefined time window; and
    assigning the document to a cluster based on the determined distances.

2. The method of claim 1 further comprising:
    storing the relative ages of each of the cluster centroids in corresponding cluster objects corresponding to clusters of documents.

3. The method of claim 1 further comprising:
    updating the relative age of the cluster centroid corresponding to the cluster to which the document was assigned.

4. The method of claim 1 wherein assigning the document to a cluster based on the determined distances comprises:
    if the determined distances between the feature vector of the document and a plurality of cluster centroids are below a predetermined threshold:
        assigning the document to clusters corresponding to the plurality of cluster centroids;
        updating the plurality of cluster centroids based on the feature vector of the document; and
        updating the relative ages of the plurality of cluster centroids.

5. The method of claim 1 wherein assigning the document to a cluster based on the determined distances comprises:
    if a determined distance between the feature vector of the document and a particular cluster centroid is less than a predetermined threshold and less than the determined distances between the feature vector of the document and the other centroids:
        assigning the document to the cluster associated with the particular centroid;
        updating the particular cluster centroid based on the feature vector of the document; and
        updating the relative age of the particular cluster centroid.

6. The method of claim 1 wherein assigning the document to a cluster based on the determined distances comprises:
    if none of the determined distances between the feature vector of the document and the cluster centroids are below a predetermined threshold:
        assigning the document to a new cluster;
        designating the feature vector of the document as a cluster centroid for the new cluster; and
        assigning a relative age to the cluster centroid for the new cluster.

7. The method of claim 1 wherein retrieving a set of cluster centroids based on the feature vector of the document and a relative age of each of the cluster centroids comprises:
    retrieving a set of cluster identifiers from a cluster hash, the cluster identifiers each indicative of a respective cluster centroid; and
    retrieving the cluster centroids corresponding to the retrieved cluster identifiers from a memory.

8. The method of claim 7 further comprising:
    updating a list of cluster identifiers in the cluster hash based on the relative age of cluster centroids corresponding to the cluster identifiers.

9. The method of claim 8 wherein updating the list of cluster identifiers based on the relative age of cluster centroids corresponding to the cluster identifiers comprises removing from the list of cluster identifiers cluster identifiers that correspond to cluster centroids with a relative age exceeding a predetermined threshold.

10. The method of claim 8 wherein updating the list of cluster identifiers based on the relative age of cluster centroids corresponding to the cluster identifiers comprises maintaining a predetermined number of cluster identifiers in the cluster table.

11. An apparatus for clustering a plurality of documents from a data stream comprising:
    means for updating a text corpus by removing one or more words that have occurred least frequently in a preprocessed document,
    means for generating a Term Frequency Inverse Document Frequency (TFIDF) to be used as a feature vector for a document in the plurality of documents; means for retrieving a set of cluster centroids based on the feature vector of the document and a relative age of each of the cluster centroids;
    means for determining a distance between the feature vector of the document and each of the cluster centroids representative of clusters that have had another document added to them within a predefined time window; and means for assigning the document to a cluster based on the determined distances.

12. The apparatus of claim 11 further comprising:
    means for storing the relative ages of each of the cluster centroids in corresponding cluster objects corresponding to clusters of documents.

13. The apparatus of claim 11 further comprising:
    means for updating the relative age of the cluster centroid corresponding to the cluster to which the document was assigned.

14. The apparatus of claim 11 wherein the means for assigning the document to a cluster based on the determined distances comprises:
    means for assigning the document to clusters corresponding to the plurality of cluster centroids;
    means for updating the plurality of cluster centroids based on the feature vector of the document; and
    means for updating the relative ages of the plurality of cluster centroids if the determined distances between the feature vector of the document and a plurality of cluster centroids are below a predetermined threshold.

15. The apparatus of claim 11 wherein the means for assigning the document to a cluster based on the determined distances comprises:
    means for assigning the document to the cluster associated with the particular centroid;
    means for updating the particular cluster centroid based on the feature vector of the document; and means for updating the relative age of the particular cluster centroid if a determined distance between the feature vector of the document and a particular cluster centroid is less than a predetermined threshold and less than the determined distances between the feature vector of the document and the other centroids.

16. The apparatus of claim 11 wherein the means for assigning the document to a cluster based on the determined distances comprises:
   means for assigning the document to a new cluster;
   means for designating the feature vector of the document as a cluster centroid for the new cluster; and
   means for assigning a relative age to the cluster centroid for the new cluster if none of the determined distances between the feature vector of the document and the cluster centroids are below a predetermined threshold.

17. The apparatus of claim 11 wherein the means for retrieving a set of cluster centroids based on the feature vector of the document and a relative age of each of the cluster centroids comprises:
   means for retrieving a set of cluster identifiers from a cluster hash, the cluster identifiers each indicative of a respective cluster centroid; and
   means for retrieving the cluster centroids corresponding to the retrieved cluster identifiers from a memory.

18. The apparatus of claim 17 further comprising:
   means for updating a list of cluster identifiers in the cluster hash based on the relative age of cluster centroids corresponding to the cluster identifiers.

19. The apparatus of claim 18 wherein the means for updating the list of cluster identifiers based on the relative age of cluster centroids corresponding to the cluster identifiers comprises means for removing from the list of cluster identifiers cluster identifiers that correspond to cluster centroids with a relative age exceeding a predetermined threshold.

20. The apparatus of claim 18 wherein the means for updating the list of cluster identifiers based on the relative age of cluster centroids corresponding to the cluster identifiers comprises means for maintaining a predetermined number of cluster identifiers in the cluster table.

21. A machine readable medium having program instructions stored thereon, the instructions capable of execution by a processor and defining the steps of:
   updating a text corpus by removing one or more words that have occurred least frequently in a preprocessed document,
   generating a Term Frequency Inverse Document Frequency (TFIDF) to be used as a feature vector for a document in a plurality of documents; retrieving a set of cluster centroids based on the feature vector of the document and a relative age of each of the cluster centroids;
   determining a distance between the feature vector of the document and each of the cluster centroids representative of clusters that have had another document added to them within a predefined time window; and
   assigning the document to a cluster based on the determined distances.

22. The machine readable medium of claim 21 wherein the instructions further define the step of:
   storing the relative ages of each of the cluster centroids in corresponding cluster objects corresponding to clusters of documents.

23. The machine readable medium of claim 21 wherein the instructions further define the step of:
   updating the relative age of the cluster centroid corresponding to the cluster to which the document was assigned.

24. The machine readable medium of claim 21 wherein the instructions for assigning the document to a cluster based on the determined distances further define the steps of:
   if the determined distances between the feature vector of the document and a plurality of cluster centroids are below a predetermined threshold:
      assigning the document to clusters corresponding to the plurality of cluster centroids;
      updating the plurality of cluster centroids based on the feature vector of the document; and
      updating the relative ages of the plurality of cluster centroids.

25. The machine readable medium of claim 21 wherein the instructions for assigning the document to a cluster based on the determined distances further define the steps of:
   if a determined distance between the feature vector of the document and a particular cluster centroid is less than a predetermined threshold and less than the determined distances between the feature vector of the document and the other centroids:
      assigning the document to the cluster associated with the particular centroid;
      updating the particular cluster centroid based on the feature vector of the document; and
      updating the relative age of the particular cluster centroid.

26. The machine readable medium of claim 21 wherein the instructions for assigning the document to a cluster based on the determined distances further define the steps of:
   if none of the determined distances between the feature vector of the document and the cluster centroids are below a predetermined threshold:
      assigning the document to a new cluster;
      designating the feature vector of the document as a cluster centroid for the new cluster; and
      assigning a relative age to the cluster centroid for the new cluster.

27. The machine readable medium of claim 21 wherein the instructions for retrieving a set of cluster centroids based on the feature vector of the document and a relative age of each of the cluster centroids further define the steps of:
   retrieving a set of cluster identifiers from a cluster hash, the cluster identifiers each indicative of a respective cluster centroid; and
   retrieving the cluster centroids corresponding to the retrieved cluster identifiers from a memory.

28. The machine readable medium of claim 27 wherein the instructions further define the step of:
   updating a list of cluster identifiers in the cluster hash based on the relative age of cluster centroids corresponding to the cluster identifiers.

29. The machine readable medium of claim 28 wherein the instructions for updating the list of cluster identifiers based on the relative age of cluster centroids corresponding to the cluster identifiers further define the step of:
   removing from the list of cluster identifiers cluster identifiers that correspond to cluster centroids with a relative age exceeding a predetermined threshold.

30. The machine readable medium of claim 21 wherein the instructions for updating the list of cluster identifiers based on the relative age of cluster centroids corresponding to the cluster identifiers further define the step of:
   maintaining a predetermined number of cluster identifiers in the cluster table.

* * * * *